(12) United States Patent
Cutler et al.

(10) Patent No.: US 9,388,950 B2
(45) Date of Patent: Jul. 12, 2016

(54) ILLUMINATION BEAM ADJUSTMENT APPARATUS AND ILLUMINATION APPARATUS

(75) Inventors: Shaun Lee Cutler, Ashington (GB); David Raymond Lambert, Ashington (GB); Anthony Gerard Whiting, Ashington (GB)

(73) Assignee: Raytec Limited, Ashington, Northumberland (GB)

( * ) Notice: Subject to any disclaimer, the term of this patent is extended or adjusted under 35 U.S.C. 154(b) by 318 days.

(21) Appl. No.: 14/238,889

(22) PCT Filed: Aug. 2, 2012

(86) PCT No.: PCT/GB2012/051868
§ 371 (c)(1),
(2), (4) Date: May 30, 2014

(87) PCT Pub. No.: WO2013/024255
PCT Pub. Date: Feb. 21, 2013

(65) Prior Publication Data
US 2014/0254165 A1    Sep. 11, 2014

(30) Foreign Application Priority Data
Aug. 15, 2011 (GB) .................................. 1113999.5

(51) Int. Cl.
*H01L 27/32* (2006.01)
*G09G 3/32* (2016.01)
(Continued)

(52) U.S. Cl.
CPC ................ *F21K 9/58* (2013.01); *G02B 19/009* (2013.01); *G02B 19/0028* (2013.01); *G02B 19/0066* (2013.01); *G02B 27/095* (2013.01); *G08B 13/19626* (2013.01)

(58) Field of Classification Search
CPC ...... F21K 9/58; G02B 27/095; G02B 19/0066
See application file for complete search history.

(56) References Cited

U.S. PATENT DOCUMENTS 6,830,359 B2    12/2004 Fleury
6,997,587 B2    2/2006 Albou
(Continued)

FOREIGN PATENT DOCUMENTS

EP    1 099 969 A2    5/2001
EP    2 128 892 A1    12/2009
(Continued)

OTHER PUBLICATIONS

International Search Report and Written Opinion under date of Dec. 11, 2012 in connection with PCT/GB2012/051868.
Search Report under date of mailing of Oct. 5, 2012 in connection with Great Britain Application No. GB1113999.5.

*Primary Examiner* — Elmito Breval
(74) *Attorney, Agent, or Firm* — Quarles & Brady LLP

(57) ABSTRACT

An illumination beam adjustment apparatus is disclosed. The apparatus comprises a housing (4), a plurality of first optical elements (12) fixed relative to the housing and adapted to receive and transmit electromagnetic radiation and adjust the beam angle of a beam of electromagnetic radiation passing therethrough, and a second optical element (14) removably mounted relative to the housing and adapted to receive electromagnetic radiation from the first optical elements and transmit electromagnetic radiation. The second optical element is adapted to adjust the beam angle of a beam of an electromagnetic radiation passing therethrough.

10 Claims, 4 Drawing Sheets

(51) Int. Cl.
*F21K 99/00* (2016.01)
*G02B 27/09* (2006.01)
*G02B 19/00* (2006.01)
*G08B 13/196* (2006.01)

(56) References Cited

U.S. PATENT DOCUMENTS

| | | | |
|---|---|---|---|
| 2003/0063261 A1* | 4/2003 | Li | G02B 6/0006 353/20 |
| 2008/0225257 A1 | 9/2008 | Kita | |
| 2009/0116210 A1 | 5/2009 | Cutler et al. | |
| 2011/0122636 A1* | 5/2011 | Tessnow | F21S 48/215 362/516 |
| 2011/0176305 A1* | 7/2011 | Schallmoser | F21K 9/00 362/235 |
| 2012/0033429 A1* | 2/2012 | Van De Ven | H05B 33/0803 362/294 |
| 2012/0327663 A1* | 12/2012 | Doan | F21V 9/08 362/294 |

FOREIGN PATENT DOCUMENTS

| | | |
|---|---|---|
| EP | 2 211 089 A1 | 7/2010 |
| WO | 2005/083318 A1 | 9/2005 |
| WO | 2010/088792 A1 | 8/2010 |

* cited by examiner

ILLUMINATION BEAM ADJUSTMENT APPARATUS AND ILLUMINATION APPARATUS

CROSS-REFERENCE TO RELATED APPLICATIONS

This application represents the national stage entry of PCT international Application No. PCT/GB2012/051868 filed Aug. 2, 2012, which claims priority to Great Britain Patent Application 11139993 filed Aug. 15, 2011, the disclosures of which are hereby incorporated by reference in their entirety for all purposes.

The present invention relates to an illumination beam adjustment apparatus and to an illumination apparatus incorporating such beam adjustment apparatus. The invention relates particularly, but not exclusively, to such apparatus for use in conjunction with security and surveillance cameras.

Security and surveillance cameras generally have a defined field of view. This field of view is dictated by a number of factors, such as the size, nature and specification of the camera chip and/or camera lens, as well as the required viewing area.

Surveillance cameras generally work in conjunction with illumination apparatus, such as infra-red (and white light) illumination for use in night time surveillance. It is desirable that the beam angle of the illumination system be closely matched to the field of view of the camera to ensure that the surveillance system consisting of the camera and illumination apparatus operate with maximum efficiency. However, it is difficult and/or expensive to produce illumination apparatus having an adjustable beam angle.

Preferred embodiments of the present invention seek to overcome one or more of the above disadvantages of the prior art.

According to an aspect of the present invention, there is provided an illumination beam adjustment apparatus comprising:—

(i) a housing;

(ii) at least one first optical element fixed relative to the housing and adapted to receive and transmit electromagnetic radiation, wherein at least one said first optical element is adapted to adjust the beam angle of a beam of electromagnetic radiation passing therethrough; and (iii) at least one second optical element removably mounted relative to the housing and adapted to receive electromagnetic radiation from at least one said first optical element and transmit electromagnetic radiation, wherein at least one said second optical element is adapted to adjust the beam angle of a beam of an electromagnetic radiation passing therethrough.

By providing at least one second optical element removably mounted relative to the housing and adapted to adjust the beam angle of a beam of an electromagnetic radiation passing therethrough, this provides the advantage of enabling an optical beam adjustment apparatus to be provided at lower cost by providing one type of support and first optical elements, and a variety of types of replaceable second optical elements, thereby enabling a wider range of beam angles to be generated by means of fewer components.

The apparatus may include support means including engaging means for engaging at least one said second optical element, such that said second optical element can only be mounted relative to the housing in a single orientation.

The engaging means may comprise at least one groove in said housing for receiving at least one said second optical element.

The engaging means may comprise at least one protrusion and/or recess on said support means adapted to engaging a corresponding recess and/or protrusion on a said second optical element.

At least one said second optical element may be adapted to be resiliently mounted to said support means.

At least one said second optical element may be adapted to be removed from and/or attached to said support means by means of a specific tool.

The apparatus may further comprise indicator means for assisting in location of at least one said second optical element relative to said housing.

The indicator means may comprise at least one marking on said support means

According to another aspect of the present invention, there is provided an illumination apparatus comprising:

at least one light emitting diode for emitting electromagnetic radiation; and at least one illumination beam adjusting apparatus as defined above for receiving electromagnetic radiation from at least one said light emitting diode.

The intensity of electromagnetic radiation emitted by at least one said light emitting diode may be adjustable by means of a remote control apparatus.

Preferred embodiments of the invention will now be described, by way of example only and not in any limitative sense, with reference to the accompanying drawings, in which.

Figure 1:
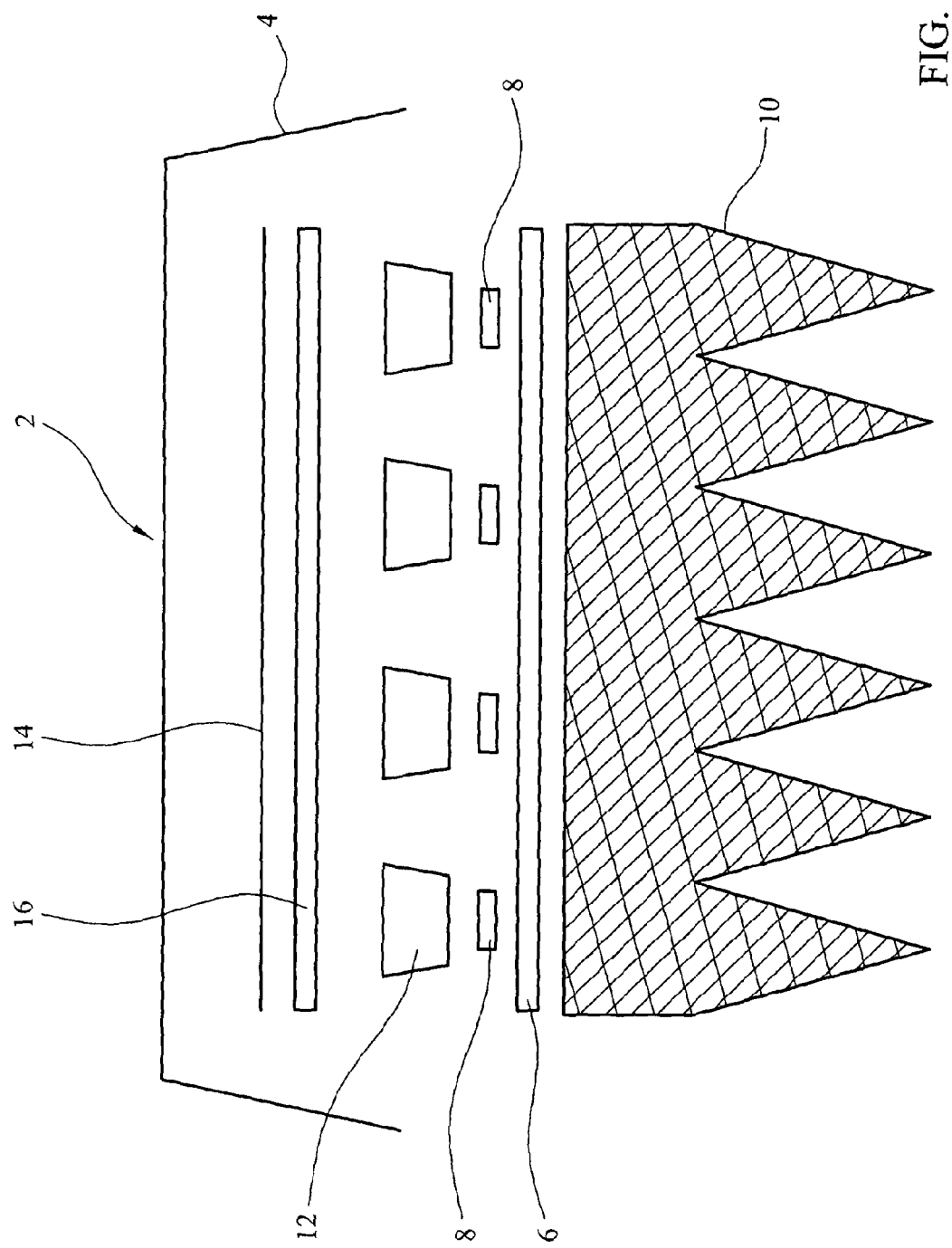
FIG. 1 is a schematic cross sectional view of an illumination apparatus embodying the present invention.
Figure 2:
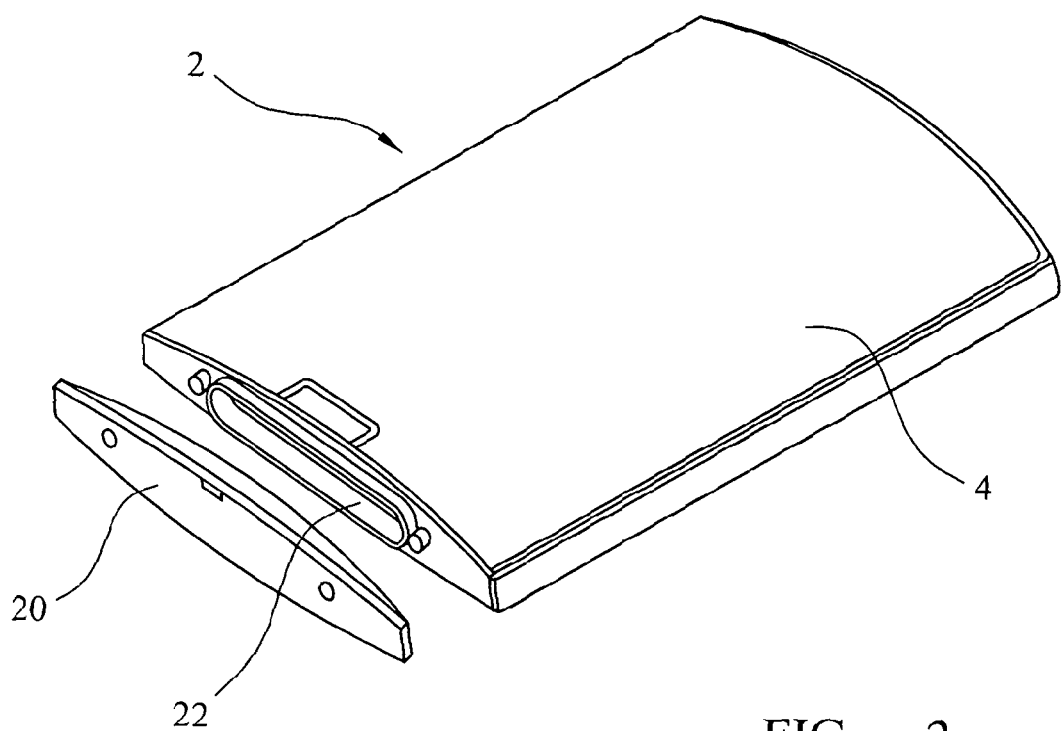
FIG. 2 is a perspective view of a housing of the illumination apparatus of FIG. 1 with an end cap thereof removed.
Figure 3:
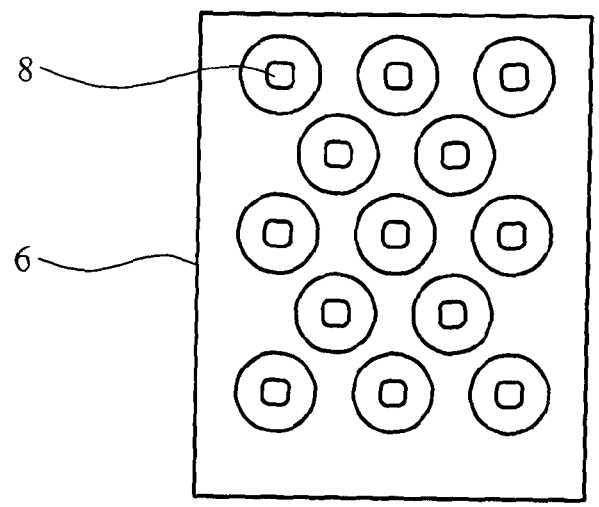
FIG. 3 is a front view of an LED array of the apparatus of FIG. 1.
Figure 4:
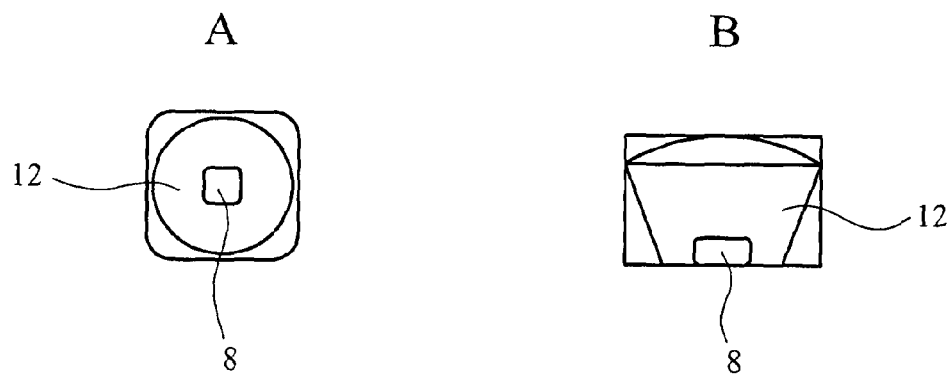
FIG. 4A is a front view of a single LED and primary optical element of the apparatus of FIG. 1.
FIG. 4B is a cross sectional side view of the LED and primary optical element of FIG. 4A.
Figure 5:
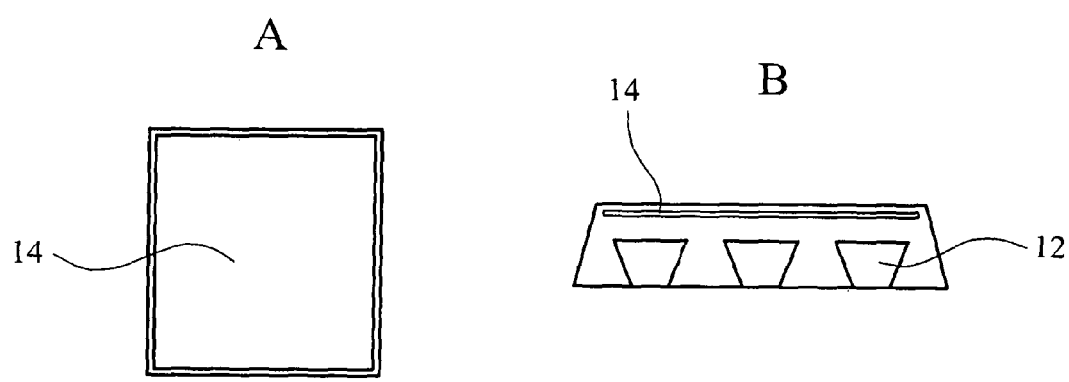
FIG. 5A is a front view of the secondary optical element in front of an array of LEDs with primary optical elements of the apparatus of FIG. 1.
FIG. 5B is a cross sectional side view of arrangement of FIG. 5A.
Figure 6:
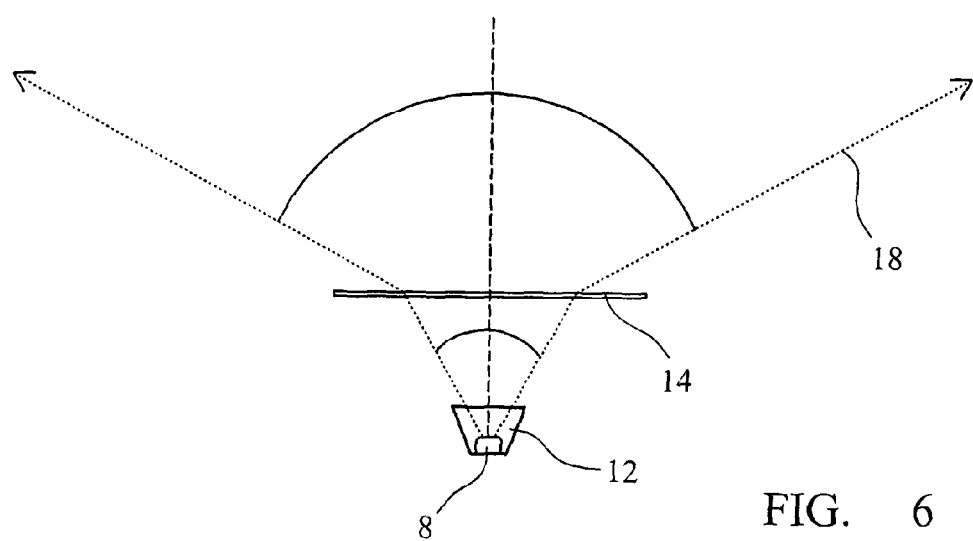
FIG. 6 is a schematic side view of a beam generated by the arrangement of FIGS. 5A and 53.

Referring to FIGS. 1 to 6, an illumination apparatus 2 for use in conjunction with a surveillance camera (not shown) has a housing in the form of a waterproof cover 4 accommodating a printed circuit board (PCB) 6, connected on one side to an array of light emitting diodes (LEDs) 8 and on the other side to a heat sink 10. The LEDs 8 typically operate in the visible white light spectrum of wavelength 400 nm to 700 nm or the near infra-red spectrum of wavelength 700 nm to 1000 nm. A respective primary optical element 12 comprising a lens or reflector is arranged to receive a beam emitted by each LED 8 and transmit a narrow beam of beam angle of less than 50 degrees, typically between 5 degrees and 50 degrees. A secondary optical element 14 is mounted to a transparent carrier 16 and comprises a diffuser or lens for receiving the beams transmitted by the primary optical elements 12 and transmits a beam 18 having beam angle between 5 degrees and 120 degrees, as shown in FIG. 6.

Figure 7:
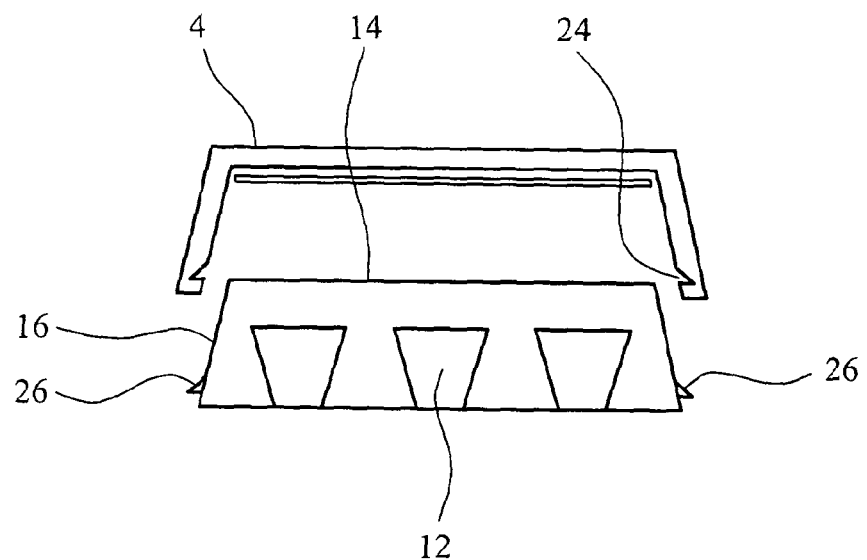
FIG. 7 is a side view of the arrangement of FIGS. 5A and 5B with a removable cover of a second embodiment of the present invention.

The secondary optical elements 14 are removably mounted relative to the housing 4 such that they can be replaced by an alternative secondary optical element 14 for transmitting a beam 18 having a different beam angle. In this way, it is possible to select a variety of final beam angles by changing only the secondary optical elements 14, thereby reducing the number of components necessary and therefore reducing the cost of manufacture of the apparatus 2. In the embodiment shown in FIG. 2, the housing 4 has a removable end cap 20 which can be removed to provide access to a slot 22 in the housing 4 for receiving secondary optical elements 14. In the arrangement shown in FIG. 1, and as shown in greater detail in FIG. 7, the waterproof cover 4 is removable to provide access to the secondary optical elements 14, which can then be removed or replaced. The cover 4 is removably mounted to the carrier 16 supporting the primary optical elements 12 and secondary optical element 14 by means of non-symmetrically shaped grooves 24 on the cover 4 cooperating with correspondingly shaped teeth 26 on the carrier 16. The removable cover 4 may be removed from the carrier 16 by means of resilient deformation of the cover 4 caused by a dedicated tool (not shown).

The intensity of the beam emitted by each light emitting diode 8 is controlled by means of a wireless remote control apparatus (not shown) such as a short range IR remote control apparatus or a short range RF remote control apparatus.

Figure 8:
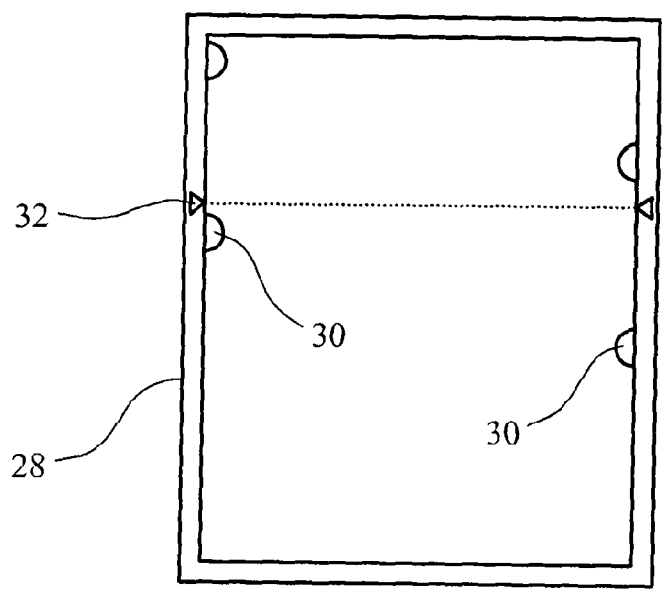
FIG. 8 is a plan view of a carrier of a third embodiment of the present invention for receiving multiple secondary optical elements.

Referring to FIG. 8, an alternative arrangement is shown in which a carrier 28 is adapted to receive at least two secondary optical elements 14 (not shown) arranged in a stack and which cooperate with each other to provide the desired beam angle. By suitable selection of the secondary optical elements 14 from a range of secondary optical elements 14, the desired beam angle can be achieved. Asymmetrically arranged protrusions 30 on the carrier 28 cooperate with correspondingly arranged grooves (not shown) on the secondary optical elements 14 to ensure that the secondary optical elements 14 can only be located in the carrier 28 in a single orientation, and visual indicators in the form of markings 32 on the carrier 28 assist in correct location of the secondary optical elements 14 in the carrier 28.

It will be appreciated by persons skilled in the art that the above embodiments have been described by way of example only, and not in any limitative sense, and that various alterations and modifications are possible without departure from the scope of the invention as defined by the appended claims.

The invention claimed is:

1. An illumination beam adjustment apparatus comprising:—
   (i) a housing;
   (ii) at least one first optical element fixed relative to the housing and adapted to receive and transmit electromagnetic radiation, wherein at least one said first optical element is adapted to adjust the beam angle of a beam of electromagnetic radiation passing therethrough; and
   (iii) at least one second optical element removably mounted relative to the housing and adapted to receive electromagnetic radiation from at least one said first optical element and transmit electromagnetic radiation, wherein at least one said second optical element is adapted to adjust the beam angle of a beam of an electromagnetic radiation passing therethrough.

2. An apparatus according to claim 1, wherein the apparatus includes at least one support device including at least one engaging device for engaging at least one said second optical element, such that said second optical element can only be mounted relative to the housing in a single orientation.

3. An apparatus according to claim 2, wherein at least one said engaging device comprises at least one groove in said housing for receiving at least one said second optical element.

4. An apparatus according to claim 2, wherein at least one said engaging device comprises at least one protrusion and/or recess on at least one said support device adapted to engaging a corresponding recess and/or protrusion on a said second optical element.

5. An apparatus according to claim 2, wherein at least one said second optical element is adapted to be resiliently mounted to at least one said support device.

6. An apparatus according to claim 2, wherein at least one said second optical element is adapted to be removed from and/or attached to at least one said support device by means of a specific tool.

7. An apparatus according to claim 1, further comprising at least one indicator device for assisting in location of at least one said second optical element relative to said housing.

8. An apparatus according to claim 7, wherein at least one said indicator device comprises at least one marking on at least one said support device.

9. An illumination apparatus comprising:
   at least one light emitting diode for emitting electromagnetic radiation; and
   at least one illumination beam adjusting apparatus according to claim 1 for receiving electromagnetic radiation from at least one said light emitting diode.

10. An apparatus according to claim 9, wherein the intensity of electromagnetic radiation emitted by at least one said light emitting diode is adjustable by means of a remote control apparatus.

* * * * *